(12) United States Patent
Singla et al.

(10) Patent No.: US 11,063,809 B2
(45) Date of Patent: Jul. 13, 2021

(54) REDUNDANT SIMPLE NETWORK MANAGEMENT PROTOCOL (SNMP) SYSTEMS AND METHODS

(71) Applicant: HEWLETT PACKARD ENTERPRISE DEVELOPMENT LP, Houston, TX (US)

(72) Inventors: Nitin Singla, Bangalore (IN); Yashavantha Nagaraju, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/270,552

(22) Filed: Feb. 7, 2019

(65) Prior Publication Data
US 2020/0186408 A1   Jun. 11, 2020

(30) Foreign Application Priority Data
Dec. 7, 2018  (IN) .............................. 201841046471

(51) Int. Cl.
*H04L 12/24* (2006.01)

(52) U.S. Cl.
CPC ........ *H04L 41/0213* (2013.01); *H04L 41/042* (2013.01); *H04L 41/0816* (2013.01);
(Continued)

(58) Field of Classification Search
CPC . H04L 41/213; H04L 41/042; H04L 41/0816; H04L 41/0853; H04L 41/0869; H04L 12/18; H04L 43/0817; H04L 47/12; H04L 63/1416; H04L 67/10; H04L 41/0866; G06F 16/24542; H04H 60/29; H04H 60/372; H04W 8/005
See application file for complete search history.

(56) References Cited

U.S. PATENT DOCUMENTS 6,664,978 B1* 12/2003 Kekic ................. H04L 41/0213
                                                      709/203
7,412,510 B2   8/2008 Schweitzer et al.
(Continued)

OTHER PUBLICATIONS

Gonsalves, A., Cisco Says Blockchain Ledger Technology Has Networking Role, (Web Page), Aug. 1, 2017, 4 Pgs.
(Continued)

*Primary Examiner* — Le H Luu
(74) *Attorney, Agent, or Firm* — McDermott Will & Emery

(57) ABSTRACT

Systems and methods are disclosed in which Simple Network Management Protocol (SNMP) servers form a blockchain network. Each SNMP server stores and maintains a local copy of a consensus ledger for which a consensus agreement has been obtained among the SNMP servers. The consensus agreement may be based on a validation of one or more fingerprints for one or more blocks of information in the ledger. The fingerprint for each block may be based on information in a preceding block. The consensus ledger includes transaction information for SNMP operations performed between the SNMP servers and managed devices. The common consensus ledger helps ensure that bandwidth, CPU time, and energy for the managed devices and the SNMP servers is not wasted on duplicate SNMP operations.

18 Claims, 6 Drawing Sheets

(52) U.S. Cl.
CPC ...... *H04L 41/0853* (2013.01); *H04L 41/0866* (2013.01); *H04L 41/0869* (2013.01)

(56) References Cited

U.S. PATENT DOCUMENTS

| | | | |
|---|---|---|---|
| 7,564,840 B2 | 7/2009 | Elliott et al. | |
| 2012/0271815 A1* | 10/2012 | Pennell, Sr. | G06F 16/24542 707/718 |
| 2012/0331497 A1* | 12/2012 | Randolph | H04H 60/372 725/14 |
| 2014/0365621 A1* | 12/2014 | Vieira | H04L 12/18 709/220 |
| 2016/0302093 A1* | 10/2016 | Fuller | H04H 60/29 |
| 2017/0019365 A1* | 1/2017 | Giansiracusa | H04L 43/0817 |
| 2017/0104813 A1* | 4/2017 | Liu | H04L 67/10 |
| 2017/0134286 A1* | 5/2017 | Veres | H04L 47/12 |
| 2017/0373921 A1* | 12/2017 | Zhou | H04L 41/0213 |
| 2018/0041891 A1* | 2/2018 | Bleyl | H04W 8/005 |
| 2018/0212979 A1* | 7/2018 | Nakamura | H04L 63/1416 |
| 2018/0248880 A1 | 8/2018 | Sardesai et al. | |
| 2018/0270100 A1* | 9/2018 | Zhou | H04L 41/0853 |

OTHER PUBLICATIONS

Isaza, G. et al., Network Management Using Multi-Agents System, (Research Paper), Jun. 21, 2013, 6 Pgs.

Multiple SNMP-server Host Expected Behaviour, (Web Page), Jul. 14, 2016, 4 Pgs.

BeatusvirXC, "Simple Network Management Protocol", Feb. 5, 2019, available online at <https://en.wikipedia.org/w/index.php?title=Simple_Network_Management_Protocol&oldid=881866602>, pp. 1-12.

Coindesk, "What Can a Blockchain Do?", Dec. 27, 2018, available online at <https://web.archive.org/web/20181227194450/https://www.coindesk.com/information/what-can-a-blockchain-do>, pp. 1-8.

Ladislav Mecir, "Blockchain", Feb. 5, 2019, available online at <https://en.wikipedia.org/w/index.php?title=Blockchain&oldid=881903704>, pp. 1-16.

Margaret Rouse, "Simple Network Management Protocol (SNMP)", Sep. 11, 2018, available online at <https://web.archive.org/web/20180911104806/https://searchnetworking.techtarget.com/definition/SNMP>, pp. 1-3.

Microsoft, "What Is SNMP", Oct. 29, 2008, available online at <https://technet.microsoft.com/pt-pt/library/cc776379(v=ws.10).aspx>, pp. 1-6.

* cited by examiner

REDUNDANT SIMPLE NETWORK MANAGEMENT PROTOCOL (SNMP) SYSTEMS AND METHODS

CROSS-REFERENCE TO RELATED APPLICATIONS

The present application claims the benefit of priority from India Provisional Patent Application Serial No. 201841046471 entitled "REDUNDANT SIMPLE NETWORK MANAGEMENT PROTOCOL (SNMP) SYSTEMS AND METHODS," filed on Dec. 7, 2019, the disclosure of which is hereby incorporated by reference in its entirety for all purposes.

BACKGROUND

Simple Network Management Protocol (SNMP) is a popular protocol for network management. SNMP is used for collecting information from, and configuring, network devices, such as servers, printers, hubs, switches, and routers on an Internet Protocol (IP) network. SNMP also allows collection and organization of information about these managed devices on IP networks and modifying that information to change device behavior.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
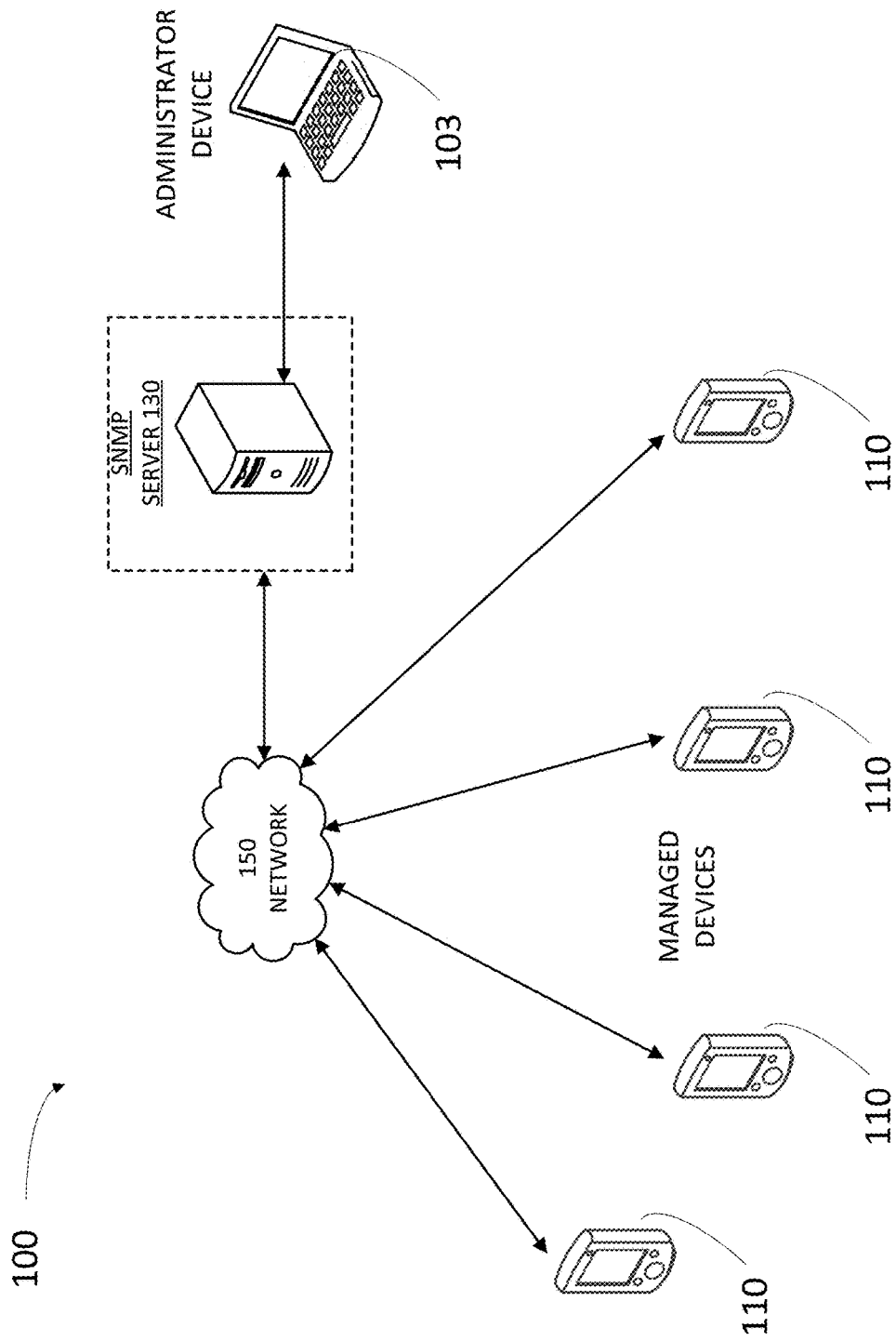
FIG. 1 illustrates an example architecture suitable for SNMP operations, according to certain aspects of the present disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, operations may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

General Overview

Currently, there is no standard implementation for providing redundancy in SNMP services. The subject disclosure provides a new way of running multiple SNMP servers together, in a way that provides proper redundancy for SNMP services. For example, multiple SNMP servers can be configured as a blockchain network in some examples.

As an improvement to existing SNMP systems, an SNMP system is disclosed herein in which multiple SNMP servers deployed in a network form a blockchain network amongst themselves. In this blockchained network, every SNMP server maintains a local copy of a common distributed ledger. The ledger contains, for example, information including SET and GET operations supported for a particular release for all of the managed devices that will be communicating with the servers.

Before performing any SNMP operation on the managed devices, the SNMP servers add their information to a consensus ledger. Once generated, the consensus ledger is stored and updated independently by each SNMP server, based on a consensus among the SNMP servers. In this system, each SNMP server processes every transaction and device, coming to its own conclusions for updating the ledger and for performing SNMP operations. Once there is a consensus among the SNMP servers, the distributed ledger has been updated, and all servers maintain their own identical copy of the consensus ledger.

All SNMP servers, having and maintaining a copy of the same consensus ledger, use the consensus ledger to determine whether any particular new SNMP operation can be performed, getting the information for the determination from the ledger copy already residing in their network. Only those operations that are authorized in the ledger for a particular SNMP server, or at a particular time, will be performed on the managed devices (e.g., using an SNMP agent).

In accordance with some aspects of the present disclosure, a computer-implemented method is provided that includes coupling multiple managed devices to a network; storing, at a first Simple Network Management Protocol (SNMP) server that is connected to the network, a consensus ledger containing information associated with the multiple managed devices, where the consensus ledger is also stored at multiple other SNMP servers that are connected to the network; and determining, with the first SNMP server and based on the consensus ledger that is stored at the first SNMP server, whether an SNMP operation can be performed for one of the managed devices.

In accordance with some aspects of the present disclosure, a system is provided that includes multiple managed devices coupled to a network, and a first Simple Network Management Protocol (SNMP) server that is connected to the network. The first SNMP server includes a memory storing instructions and a consensus ledger, the consensus ledger containing information associated with the multiple managed devices. The consensus ledger is also stored at multiple other SNMP servers that are connected to the network. The SNMP server also includes one or more processors configured to execute the instructions to determine, based on the consensus ledger that is stored in the memory at the first SNMP server, whether an SNMP operation can be performed for one of the managed devices In accordance with some aspects of the present disclosure, a computer-implemented method is provided that includes storing, at each of a plurality of Simple Network Management Protocol (SNMP) servers connected to a network, validation rules for validating blocks of a consensus ledger. The method also includes receiving, at each of the SNMP servers, information associated with managed devices that are connected to the network. The method also includes adding, with each of at least some of the SNMP servers, portions of the information received at that SNMP server to one or more blocks, each block including a fingerprint generated according to the validation rules. The method also includes obtaining, with at least some of the SNMP servers, a consensus agreement for including each of the one or more blocks in the consensus ledge. The method also includes, responsive to the consensus agreement, including each block for which the consensus agreement was obtained to the consensus ledger.

Example System Architecture

FIG. 1 illustrates an example architecture 100 suitable for SNMP services, according to some aspects of the disclosure. Architecture 100 includes a management server, which may be implemented as an SNMP server 130, and managed devices 110 connected over a network 150. Managed devices 110 may be implemented as cable modems, routers, switches, servers, hubs, workstations, printers, laptops, desktops, mobile devices, smart phones, tablets, or any other computer device capable to communicate with server 130 through network 150 (e.g., using SNMP protocols). An administrator device 103 may be used to set preferences for the SNMP operations and/or consensus operations (e.g., blockchain operations) for SNMP server 130.

Server 130 is configured to host a memory including instructions which, when executed by a processor, cause the server 130 to perform at least some of the steps in methods as disclosed herein. In some embodiments, the processor is configured to perform GET, RESPONSE, GETNEXT, GETBULK, SET, and/or TRAP operations of the SNMP protocol for one or more of managed devices 110, as would be understood by one skilled in the art.

In the example of FIG. 1, only a single SNMP server 130 is shown. However, in the systems and methods disclosed herein, multiple SNMP servers 130 can be provided for management of managed devices 110, the servers 130 being configured to provide efficient and secure redundant SNMP services for the managed devices.

Figure 2:
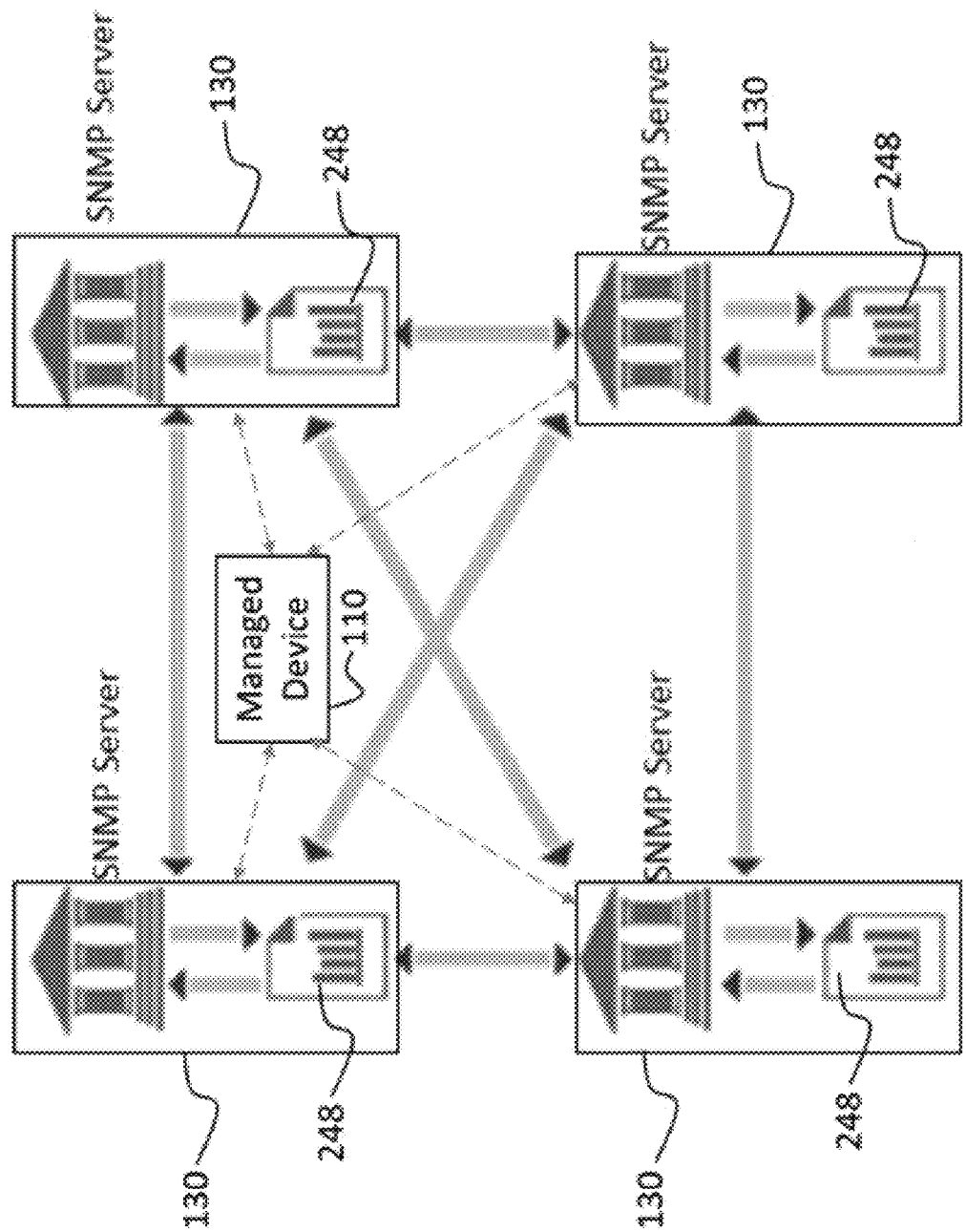
FIG. 2 is a schematic illustration of a system having multiple SNMP servers arranged as a blockchain network, according to certain aspects of the present disclosure.

For example, as shown in FIG. 2, multiple SNMP servers 130 may be configured as a blockchain network. In this example, the processor of each of multiple SNMP servers 130 is configured to perform the GET, RESPONSE, GETNEXT, GETBULK, SET, and/or TRAP operations of the SNMP protocol for one or more of managed devices 110. However, the processor of a particular SNMP server 130 only performs these operations upon confirmation that the SNMP operation can be performed, based on a consensus copy of a ledger 248 stored at that SNMP server and maintained by that SNMP server based on a consensus agreement with the other SNMP servers.

In the example system of FIG. 2, each SNMP server 130 maintains a consensus copy of a ledger 248 including device and/or transaction information for managed devices 110 on a network, such as network 150 of FIG. 1. Each server 130 consults its own copy of the ledger 248 before performing an SNMP operation for a managed device 110, so that the multiple SNMP servers 130 can avoid overlapping efforts with the same device 110. This creates a more efficient SNMP process and reduces CPU, memory, and bandwidth usage for the servers 130 and managed devices 110.

The consensus (e.g., blockchain) aspects of the system govern the updates to the ledger 248 for each transaction and also can provide security for the ledger 248 depending on an administrator's selection of the sophistication of the ledger. For example, the consensus ledger 248 that is maintained and stored at each of SNMP servers 130, may include unencrypted data (e.g., data that can be read by every SNMP server 130 and is fully transparent), encrypted data (e.g., data that can be read by every SNMP server 130 with a decryption key, the key providing access to the data and providing access to information associated with the entity that added the data), and/or hashed data (e.g., data that can be presented alongside the function that created it to show the data wasn't tampered with).

In some scenarios, hashes may be used in combination with original data stored off-chain. Digital fingerprints, for example, may be hashed into the consensus ledger, while the main body of information can be stored offline.

In these examples, since all of SNMP servers 130 will be maintaining their own copy of the single distributed ledger 248 having information about devices 110 (e.g., regarding allocated resources), conflicts and/or issues of multiple SNMP walks performed by different SNMP servers can be avoided or eliminated.

Example Implementation

Figure 3:
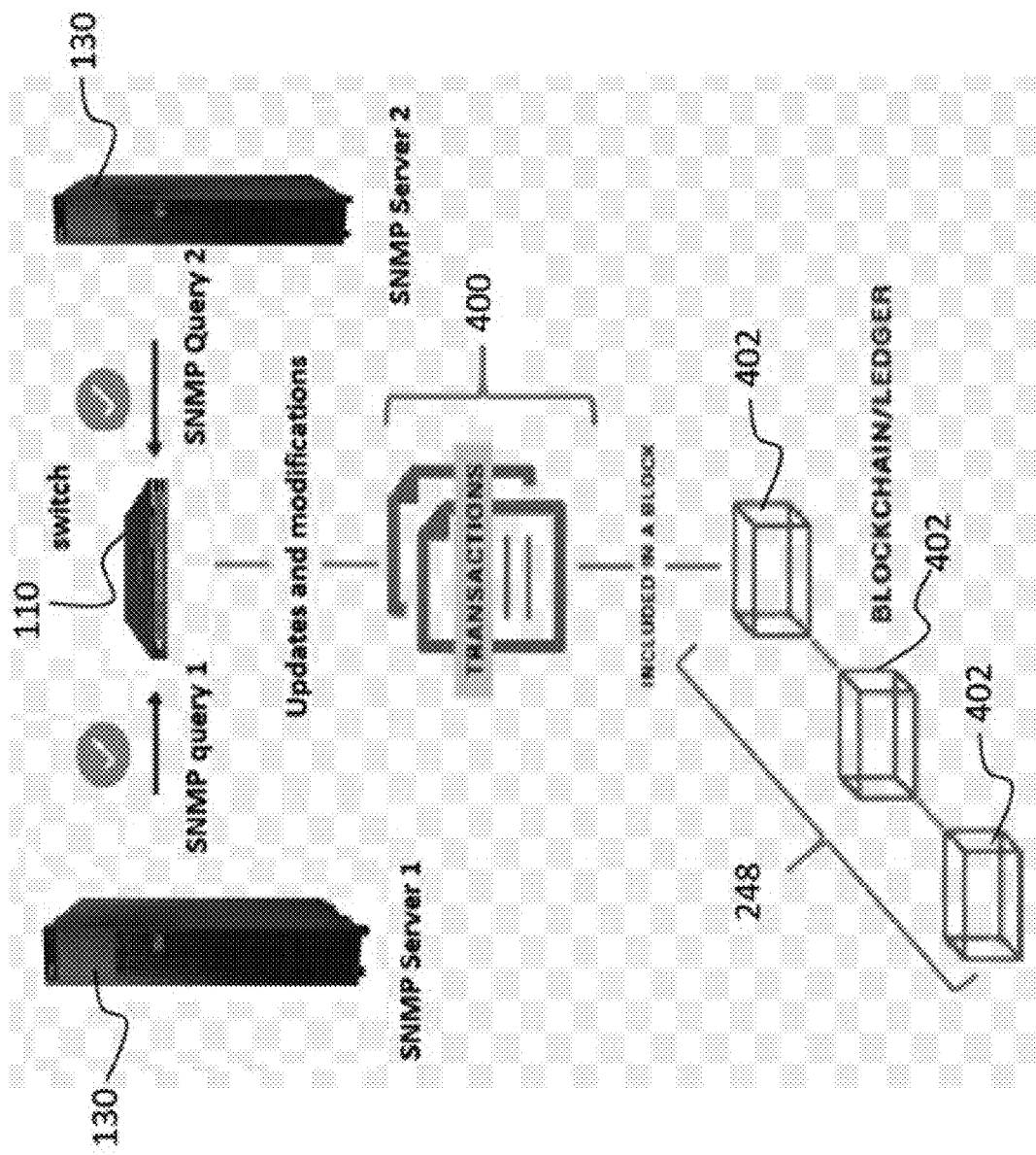
FIG. 3 is a schematic illustration of a consensus ledger, implemented as a blockchain that includes transactions associated with managed devices and SNMP servers, according to certain aspects of the present disclosure.

As shown in FIG. 3, consensus ledger 248 may be a blockchain that includes a chain of blocks 402, each including information associated with transactions 400 such as queries and/or responses between SNMP servers 130. In the example of FIG. 3, SNMP Server 1 and SNMP server 2 respectively send SNMP Query 1 and SNMP Query 2 to a managed device 110 implemented as a switch.

Because each SNMP server 130 consults its own copy of ledger 248 before performing an SNMP operation such as an SNMP query, the systems and methods disclosed herein ensure that SNMP Query 2 is only performed by SNMP Server 2 if, for example, SNMP Query 2 by SNMP Server 2 is not obviated by the already performed SNMP Query 1 by SNMP Server 1. Consensus ledger 248 may be a public permissionless blockchain, a public permissioned blockchain, a private permissionless blockchain, or a private permissioned blockchain, in various examples.

An administrator operating administrator device 103 of FIG. 1 may configure each of SNMP servers 130 to generate the desired type of consensus ledger in cooperation with the other SNMP servers. One or more of blocks 402 may include one or more pointers or other references to SNMP information stored in other blocks 402.

Although blocks 402 are generally described herein as storing only SNMP information, it should be appreciated that some blocks may store other information that is unrelated to the network management. For example, in some implementations, consensus ledger 248 may be integrated into an existing blockchain network. In this example, some of blocks 402 include other information associated with the existing blockchain network, and consensus ledger 248 is formed by blocks 402 that are added to the existing blockchain at various locations and that store SNMP information as described herein.

In this regard, it should also be appreciated that some of blocks 402 may store other information without including SNMP information other than pointers referencing SNMP information in other blocks, and/or some of blocks 402 may be free of any SNMP information and may store only other information that is unrelated to the network management.

Figure 4:
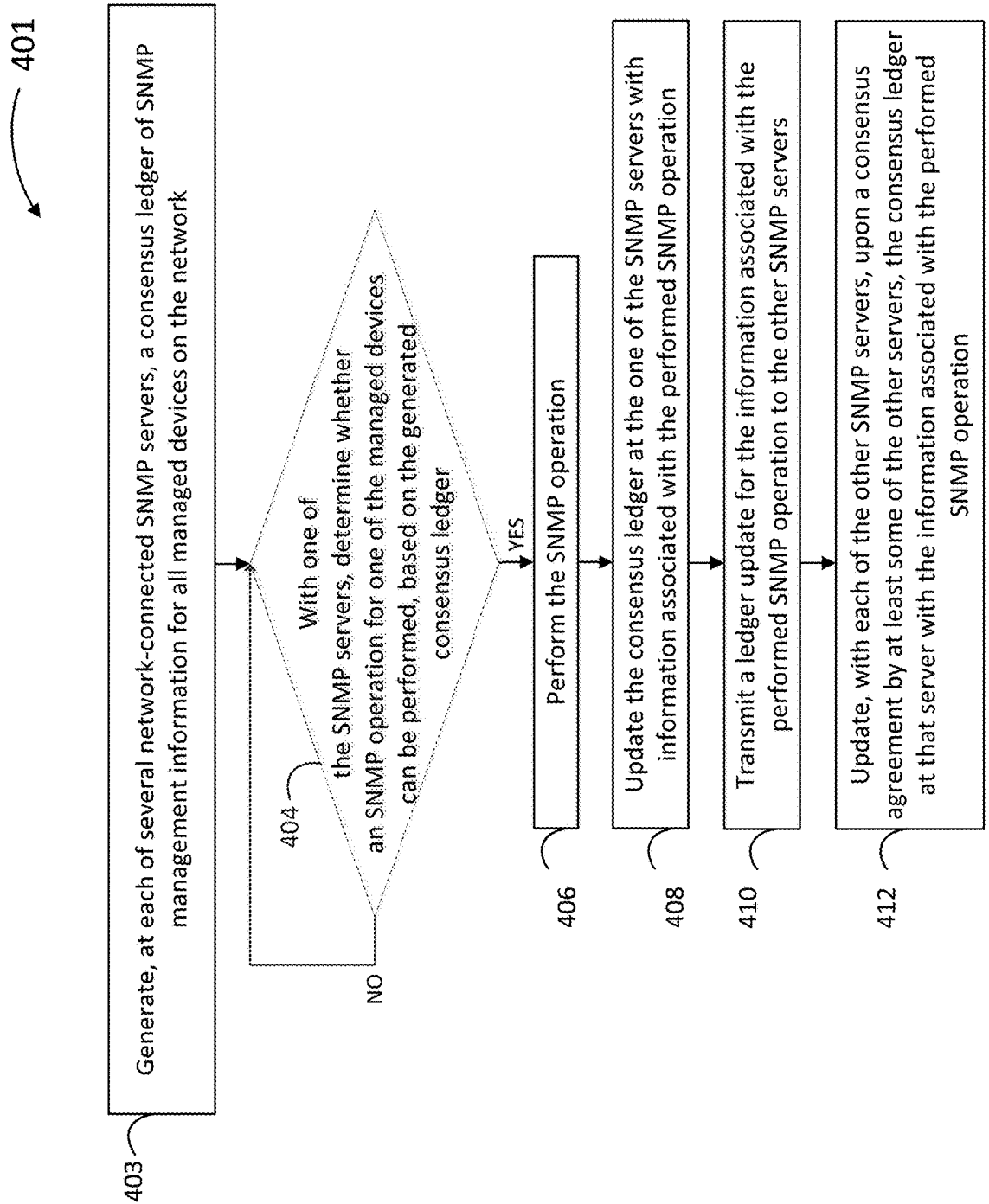
FIG. 4 is a flow chart illustrating SNMP operations using a blockchain of SNMP servers, according to certain aspects of the disclosure.

FIG. 4 is a flow chart illustrating operations in a method 401 for operating a network of SNMP servers and devices managed by those servers, using a consensus ledger, according to some embodiments. Method 401 may be performed at least partially by any one of SNMP servers 130, while communicating with one or more of a plurality of other SNMP servers 130, managed devices 110, and/or other devices connected to the same network. At least some of the steps in method 401 may be performed by a computer having a processor executing commands stored in a memory of the computer. Methods consistent with the present disclosure may include at least some, but not all, of the operations illustrated in method 401, performed in a different sequence. Furthermore, methods consistent with the present disclosure may include at least two or more operations as in method 401 performed overlapping in time, or almost simultaneously.

At block 403, at each of several SNMP servers such as SNMP servers 130 that are connected to a network such as network 150, a consensus ledger 248 of SNMP information for all managed devices on the network may be generated.

At block 404, with the one of the SNMP servers 130, it may be determined whether an SNMP operation for one of the managed devices can be performed, based on the consensus ledger 248. For example, the one of the SNMP servers 130 may determine, based on an entry for the SNMP operation in the ledger, that the SNMP operation has already been performed by another SNMP server and that the SNMP operation thus cannot be performed by that SNMP server.

As another example, the one of the SNMP servers may determine, based on an entry for the managed device in the ledger, that another SNMP server is responsible for that SNMP operation for the managed device and thus the SNMP operation cannot be performed by that server.

As another example, the one of the SNMP servers may determine, based on the ledger, that no other SNMP server has performed that SNMP operation in a predetermined period of time and thus the SNMP operation can be performed.

As indicated in FIG. 4, if it is determined at block 404 that the SNMP operation has already been performed, the method 401 may further include taking no action for the SNMP operation at the first SNMP server and returning to block 404 to check the ledger for a next SNMP operation.

At block 406, with the one of the SNMP servers 130 and if it is determined at block 404 that the SNMP operation can be performed, the one of the SNMP servers performs the SNMP operations (e.g., a GET operation or other SNMP operation).

At block 408, the consensus ledger is updated at the one of the SNMP servers 130 with information associated with the performed SNMP operation. For example, the one of the SNMP servers 130 may add information associated with the SNMP operation (e.g., a transaction log entry) to a new block for the ledger and generate a fingerprint for the ledger based on the validation rules. The added information can be encrypted before being added to the new block, if desired. The fingerprint may be based on (e.g., a hash of) the contents of a preceding block.

At block 410, a ledger update (e.g., the new block and the associated fingerprint) for the information associated with the performed SNMP operation is indicated (e.g., transmitted) to the other SNMP servers 130.

At block 412, with each of the other SNMP servers 130, upon a consensus agreement by at least some of the other SNMP servers 130 (e.g., an agreement that the fingerprint is valid according to the validation rules), the consensus ledger at that SNMP servers 130 is updated. Upon consensus agreement, the copy of the consensus ledger stored at each of SNMP servers 130 includes the information associated with the performed SNMP operation.

Figure 5:
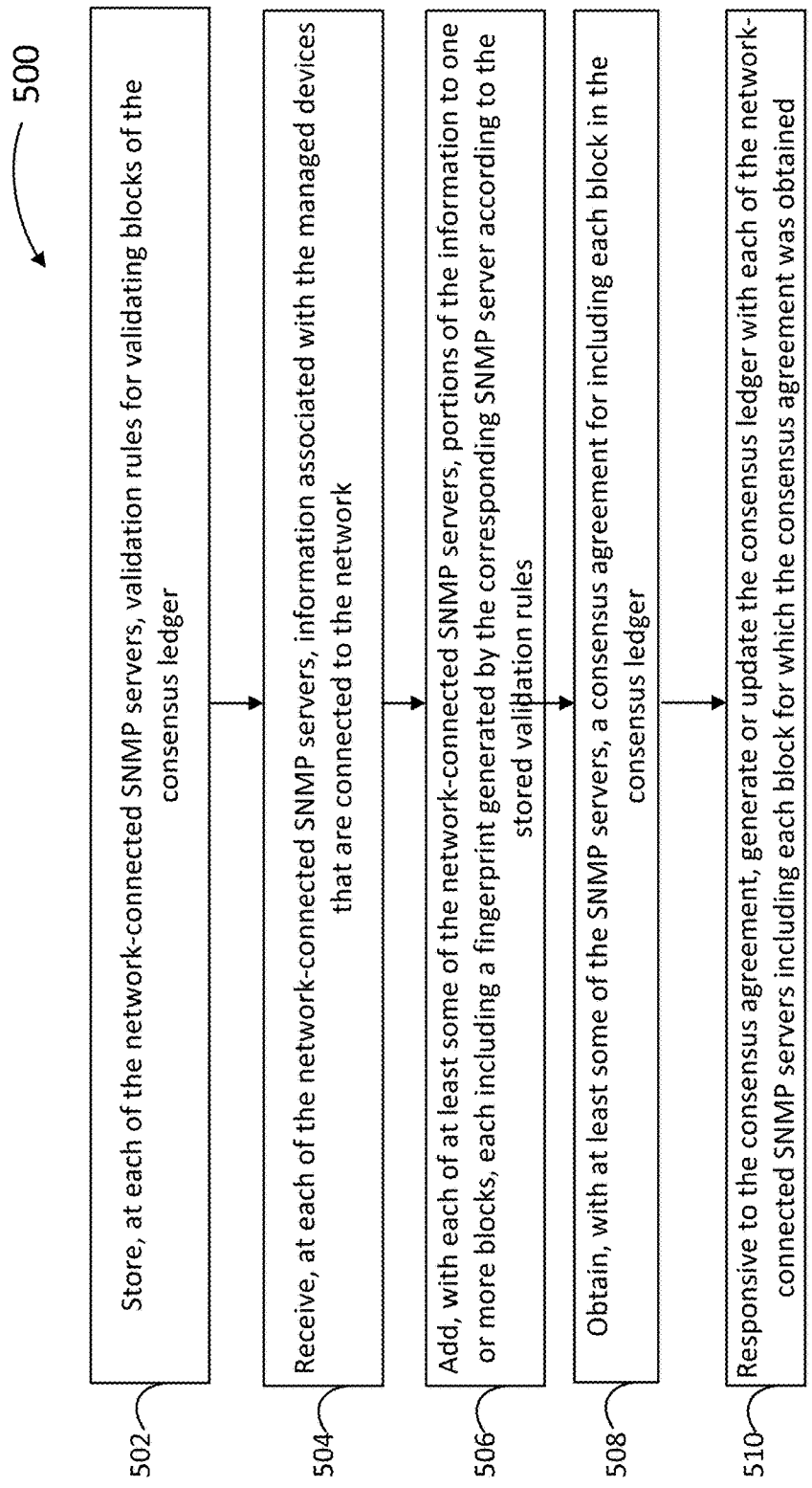
FIG. 5 is a flow chart illustrating operations for generating a consensus ledger, according to certain aspects of the disclosure.

FIG. 5 is a flow chart illustrating operations in a method 500 for generating a consensus ledger as described at block 403 of FIG. 4. Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

At block 502, at each of the SNMP servers 130 connected to network 150, validation rules for validating blocks of the consensus ledger may be stored. The validation rules may include consensus parameters and/or other information for validating updates to ledger 248 (e.g., for generating and/or validating block fingerprints). The SNMP servers may also store instructions for information that is added to the ledger (e.g., whether and what information should be encrypted before inclusion in a block) and/or for the overall structure of the ledger (e.g., a private, public, permissioned, and/or permissionless ledger).

At block 504, at each of the SNMP servers 130, information associated with each of the managed devices 110 that are connected to the network may be received. For example, for each managed device, identifying information, password information, bandwidth information, geographical location information, and/or any other information suitable for providing SNMP servers to that device can be received.

At block 506, with each of at least some of the SNMP servers 130, portions of the information are added to one or more blocks, each block including a fingerprint generated by the corresponding SNMP server 130 according to the stored validation rules. The fingerprint of each block (see, e.g., blocks 402 of FIG. 3) is generated based on validation rules that are known by (e.g., stored at or accessible by) each of SNMP servers 130.

For example, the fingerprint of each block 402 may include or be based on information associated with a previous block 402, such that the blocks 402 form a blockchain. The information associated with the previous block may be, for example, a cryptographic hash of the previous block, such that the blockchain provides security against modifications to the consensus ledger without the consensus of the network of SNMP servers 130. In this example, the cryptographic hash of the previous block may serve as the fingerprint for the current block. However, it should be appreciated that other fingerprints can be used so long as the fingerprints are generated using validation rules that are known to and common to all SNMP servers 130.

In this way, a distributed consensus ledger 248 is provided that prevents tampering and revision, which facilitates confirmation of the authenticity and security of every transaction recorded on the chain (e.g., without requiring the password and/or other authentication operations). In some scenarios, consensus ledger 248 may be also be provided to and/or maintained by other devices on the network such as managed devices 110.

By implementing consensus ledger 248 as a chain of blocks 402 as described herein, the consensus ledger 248 is provided with a resistance to modification of the data, which provides providing enhanced security for SNMP operations. In this way, a permanent record of all SNMP operations is also available to any SNMP server.

At block 508, with at least some of the SNMP servers 130, a consensus agreement (e.g., based on the validation rules) may be obtained for including each block in the consensus ledger 248.

At block 510, responsive to the consensus agreement, the consensus ledger may be generated (e.g., for a primary block) or updated (e.g., for all other blocks) with each of the SNMP servers 130 including each block for which the consensus agreement was obtained.

The systems and methods disclosed herein provide various advantages over existing SNMP services. For example, as every SNMP server will be storing a copy of system information in its distributed ledger, statistics that are included in the consensus ledger can also be used against spoofing. This can also help to prevent security attacks such as DDOS, DOS, ARP cache poisoning, MITM, etc.

As another example, the systems and methods disclosed herein can help save CPU and memory utilization of the servers and devices, as a result of the distributed ledger technology.

As another example, the systems and methods disclosed herein can help provide a permanent, public, transparent ledger that can also be utilized for operations other than network management. For example, the ledger can also be used for compiling data on sales, and/or tracking digital use and payments to content creators, such as wireless users or musicians.

As another example, the systems and methods disclosed herein can help provide a consensus ledger that is resistant to modification of the data, thus providing enhanced security for SNMP services.

Hardware Overview

Figure 6:
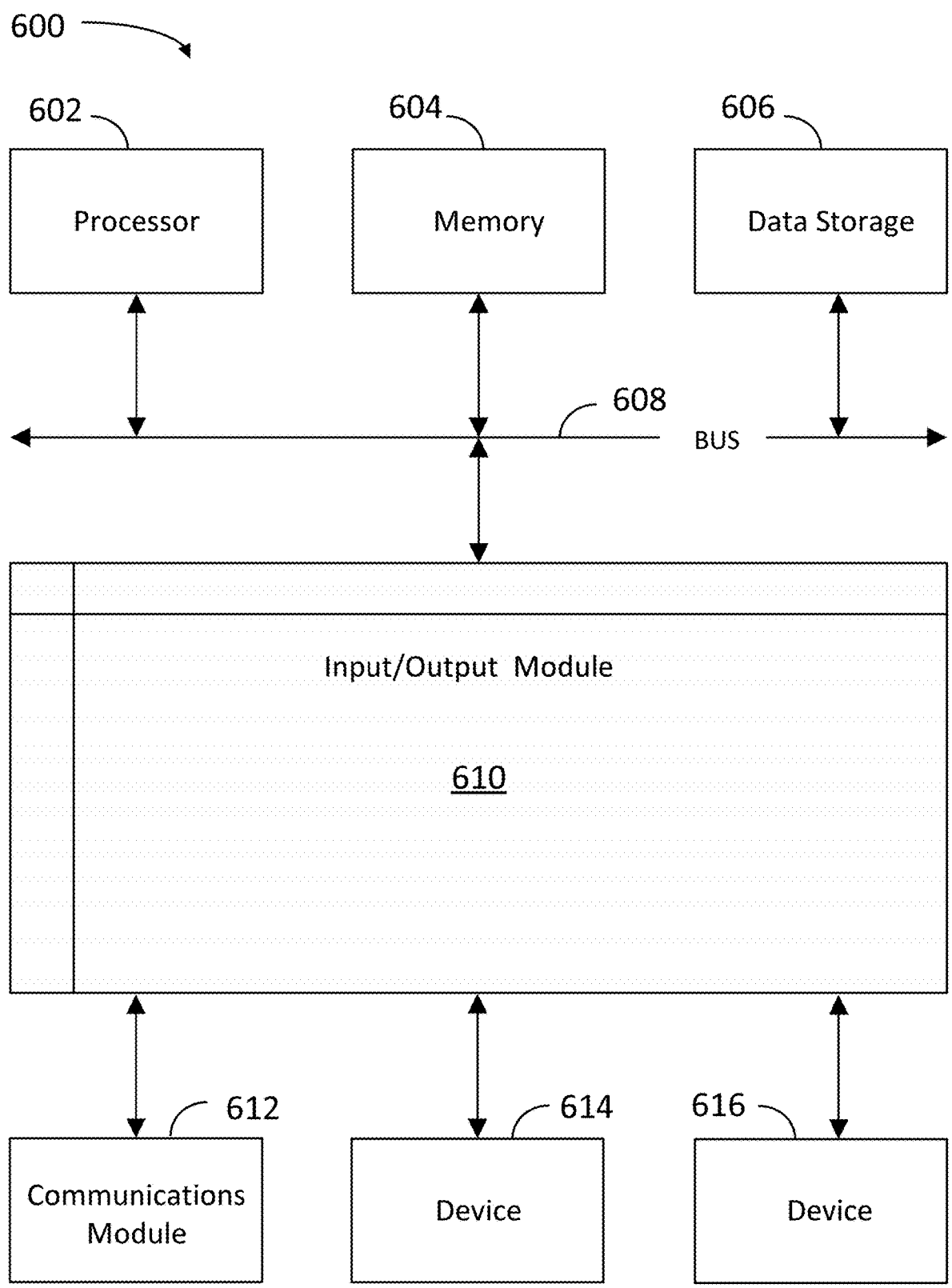
FIG. 6 illustrates an electronic system with which one or more implementations of the subject technology may be implemented.

FIG. 6 conceptually illustrates electronic system 600 with which one or more aspects of the subject technology may be implemented. Electronic system 600, for example, may be, or may be a part of, an SNMP sever, a managed device, or an administrator device implemented in standalone device, a server, a portable electronic device such as a laptop computer, a tablet computer, a phone, a wearable device, or a personal digital assistant (PDA), a vehicle, an appliance, or generally any electronic device that transmits signals over a network. Such an electronic system includes various types of computer readable media and interfaces for various other types of computer readable media. Electronic system 600 includes bus 608, processing unit(s) 612, system memory 604, read-only memory (ROM) 610, permanent storage device 602, input device interface 614, output device interface 606, and network interface 616, or subsets and variations thereof.

Bus 608 collectively represents all system, peripheral, and chipset buses that communicatively connect the numerous internal devices of electronic system 600. In one or more embodiments, bus 608 communicatively connects processing unit(s) 612 with ROM 610, system memory 604, and permanent storage device 602. From these various memory units, processing unit(s) 612 retrieves instructions to execute and data to process in order to execute the processes of the subject disclosure. The processing unit(s) can be a single processor or a multi-core processor in different embodiments.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. One or more embodiments of the subject disclosure use a mass-storage device (such as a magnetic or optical disk and its corresponding disk drive) as permanent storage device 602.

Other embodiments use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores any of the instructions and data that processing unit(s) 612 needs at runtime. In one or more embodiments, the processes of the subject disclosure are stored in system memory 604, permanent storage device 602, and/or ROM 610. From these various memory units, processing unit(s) 612 retrieves instructions to execute and data to process in order to execute the processes of one or more embodiments.

Bus 608 also connects to input and output device interfaces 614 and 606. Input device interface 614 enables a user to communicate information and select commands to the electronic system. Input devices used with input device interface 614 include, for example, alphanumeric keyboards, pointing devices (also called "cursor control devices"), cameras or other imaging sensors, or generally any device that can receive input. Output device interface 606 enables, for example, the display of images generated by electronic system 600. Output devices used with output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more embodiments may include devices that function as both input and output devices, such as a touch screen. In these embodiments, feedback provided to the user can be any form of sensory feedback, such as visual feedback, auditory feedback, or tactile feedback; and input from the user can be received in any form, including acoustic, speech, or tactile input.

Finally, as shown in FIG. 6, bus 608 also couples electronic system 600 to a network (not shown) through network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more embodiments, the computer readable media is non-transitory computer readable media, computer readable storage media, or non-transitory computer readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that some or all steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the appended claims. Moreover, nothing disclosed herein is intended to be dedicated to the public regardless of whether such disclosure is explicitly recited in the claims. No claims element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Brief Description of the Drawings, and Claims of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims reflect, inventive subject matter lies in less than all features of a single disclosed configuration or operation. The following claims are hereby incorporated into the Detailed Description, with each claim standing on its own to represent separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A computer-implemented method, comprising:
   coupling multiple managed devices to a network;
   storing, at a first Simple Network Management Protocol (SNMP) server that is connected to the network, a blockchain containing information associated with the multiple managed devices, wherein the blockchain is also stored at multiple other SNMP servers that are connected to the network; and
   determining, with the first SNMP server and based on the blockchain that is stored at the first SNMP server, whether an SNMP operation can be performed for one of the managed devices.

2. The computer-implemented method of claim 1, wherein the determining comprises determining that the SNMP operation has already been performed, and wherein the method further comprises taking no action for the SNMP operation at the first SNMP server.

3. The computer-implemented method of claim 1, wherein the determining comprises determining that the SNMP operation can be performed, and wherein the method further comprises performing the SNMP operation at the first SNMP server.

4. The computer-implemented method of claim 3, further comprising updating, at the first SNMP server, the blockchain stored at the first SNMP server.

5. The computer-implemented method of claim 4, further comprising providing, to the multiple other SNMP servers from the first SNMP server, an indication of an updated blockchain.

6. The computer-implemented method of claim 1, wherein the blockchain is a public permissionless ledger.

7. The computer-implemented method of claim 1, wherein the blockchain is a public permissioned ledger.

8. The computer-implemented method of claim 1, wherein the blockchain is a private permissionless ledger.

9. The computer-implemented method of claim 1, wherein the blockchain is private permissioned ledger.

10. A system, comprising:
    multiple managed devices coupled to a network; and
    a first Simple Network Management Protocol (SNMP) server that is connected to the network and that comprises:
       a memory storing instructions and a consensus ledger, the consensus ledger containing information associated with the multiple managed devices, wherein the consensus ledger is also stored at multiple other SNMP servers that are connected to the network; and
       one or more processors configured to execute the instructions to:
          determine, based on the consensus ledger that is stored in the memory at the first SNMP server, whether an SNMP operation can be performed for one of the managed devices;
          store validation rules for validating blocks of the consensus ledger;
          add information to a block for the consensus ledger using the validation rule; and
          obtain a consensus agreement for including the block in the consensus ledger from at least some of the other SNMP servers.

11. The system of claim 10, wherein the managed devices include at least one of a server, a printer, a hub, a switch, and a router.

12. The system of claim 10, wherein the one or more processors are further configured to:
    perform the SNMP operation; and
    update the consensus ledger stored in the memory of the first SNMP server to include information associated with the SNMP operation.

13. The system of claim 12, further comprising the multiple other SNMP servers, and wherein the one or more processors are further configured to provide, to the multiple other SNMP servers, an indication of an updated consensus ledger.

14. The system of claim 10, wherein the consensus ledger is a public permissionless ledger, a public permissioned ledger, a private permissionless ledger, or a private permissioned ledger.

15. The system of claim 10, wherein the one or more processors are further configured to receive a new block for the consensus ledger from one of the multiple other SNMP servers and validate the new block based on a fingerprint in the new block, the fingerprint based on information in a previous block of the consensus ledger.

16. A computer-implemented method, comprising:

storing, at each of a plurality of Simple Network Management Protocol (SNMP) servers connected to a network, validation rules for validating blocks of a consensus ledger;

receiving, at each of the SNMP servers, information associated with managed devices that are connected to the network;

adding, with each of at least some of the SNMP servers, portions of the information received at that SNMP server to one or more blocks, each block including a fingerprint generated according to the validation rules;

obtaining, with at least some of the SNMP servers, a consensus agreement for including each of the one or more blocks in the consensus ledger; and responsive to the consensus agreement, including each block for which the consensus agreement was obtained to the consensus ledger.

17. The computer-implemented method of claim 16, wherein the fingerprint for each block is based on information associated with at least one other block.

18. The computer-implemented method of claim 17, wherein the information associated with at least one other block comprises a hash of contents of a preceding block.

* * * * *